(No Model.)

J. SHEARMAN.
VALVE FOR AIR AND GAS METERS.

No. 519,481. Patented May 8, 1894.

Witnesses.
James B Gorman
William F Doty

Inventor.
John Shearman

UNITED STATES PATENT OFFICE.

JOHN SHEARMAN, OF NEW YORK, N. Y.

VALVE FOR AIR AND GAS METERS.

SPECIFICATION forming part of Letters Patent No. 519,481, dated May 8, 1894.

Application filed May 1, 1893. Serial No. 472,645. (No model.)

*To all whom it may concern:*

Be it known that I, JOHN SHEARMAN, a subject of the Queen of Great Britain, residing in the city, county, and State of New York, have invented certain new and useful Improvements in Gas-Meters, of which the following is a specification.

My invention relates to the valves communicating between the receiving chamber and the bellows, bellows chambers and outlet of a gas meter, and my improvements consist of a peculiarly constructed slide-valve pivoted and chambered with a valve seat boxing having three interior compartments and suitable outlets therefrom and also of the combination of the same with the other operating parts of the gas meter—all as hereinafter more fully described reference being had to the accompanying drawings in which—

Figure 1:
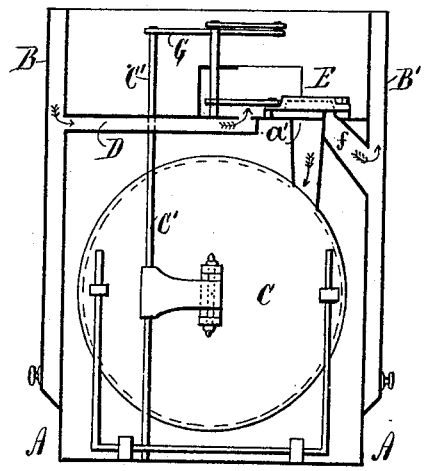
Figure 2:
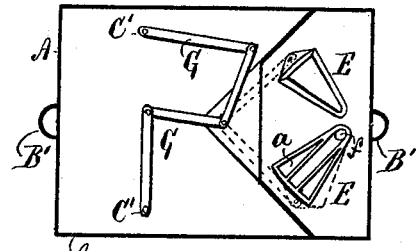
Figure 3:
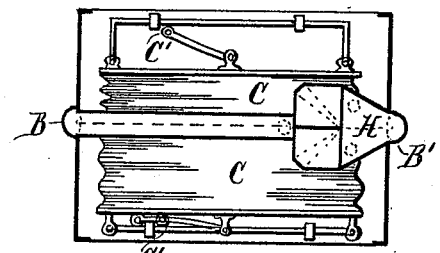
Figure 4:
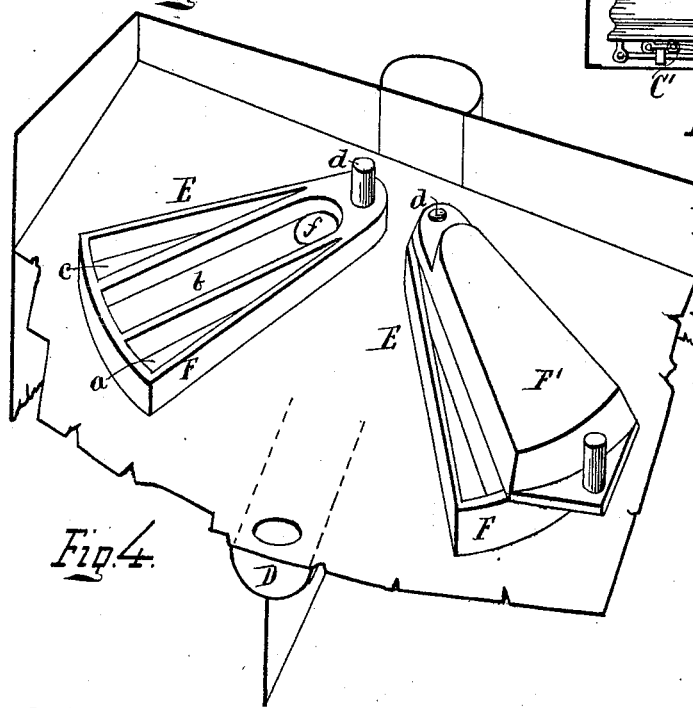
Figure 5:
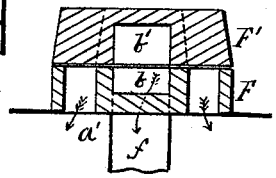

Figure 1 represents a vertical, sectional view of a gas meter containing my valves, all sectional excepting the bellows, of which a face view is given as set therein to illustrate the connecting rods and levers actuating the valves by motion derived from the bellows. Fig. 2 is a horizontal section of the gas meter through the receiving chamber showing location and arrangement of valves therein with the levers by which they are actuated by motion derived from the bellows alternately— one of the valves removed from its seat, its position shown by dotted lines. Fig. 3 is a horizontal section through the lower chambers (in which are located the bellows) on a line just below the top of said chambers—the line of partition dividing the bellows chambers is dotted. Fig. 4 is a perspective view of a portion of the receiving chamber—exhibiting the two valve seat boxings—one with valve plate removed and the other partly to one side uncovering one chamber therein. Fig. 5 is a vertical section across one of the valves—valve seat and immediate connections.

On the drawings A, indicates the outer walls or casing forming the gas meter.

B, indicates the inlet pipe for incoming gas and B', the outlet pipe for gas on its way to the burners.

C, indicates the bellows, of which there are two—a partition midway divides the lower part of the meter into two chambers to each of which a bellows is provided, dotted line Fig. 3, shows the partition.

The parts A, B, B', and C are formed as usual—each bellows has at its front an arm connected to a vertical rod C' to vibrate, at the upper end of which are lever connections with the valves in the receiving chamber— which forms the upper division of the meter and covers the two lower chambers.

D, indicates a pipe passage located beneath the bottom of receiving chamber open to inlet pipe B, and at its interior end communicating through an aperture with the receiving chamber, arrows show the direction of the entering gas current. In the receiving chamber are located the valves which are the important part of this invention.

E, indicates the valve devices of which there are two, each comprising a valve seat, resting on or forming part of the bottom of the receiving chamber, and formed as a boxing— the upper edge of which is the valve seat proper—this boxing (shown at F), is divided interiorly into three spaces or chambers as receptacles for gas—$a$, $b$, and $c$. Preferably each valve seat is fan shaped as in Figs. 2 and 4, and at the small end is provided with a pivot $d$, upon which is pivoted the valve proper, also fan shaped, as a cover F', over seat or boxing F, resting lightly thereupon—the valve plate F', is formed with an upwardly indented groove, recess or chamber $b'$, in size and shape corresponding with central chamber $b$, of valve seat boxing. The valve plate, when motion is applied swings on its pivot— each valve being operated with alternating motion.

The chamber $a$, of each valve seat communicates through the bottom by an aperture and passage $a'$ (inclosed each, from the bellows chamber), to the interior of the bellows— so that as said passages are alternately covered and uncovered by the swing of the valve plates gas proceeding from the receiving chamber reaches the bellows interior.

The chamber $c$, of each valve seat boxing communicates through aperture in its bottom with the bellows chamber direct, admitting gas thereto as the swing of the valve plate covers and uncovers the passage way—alternating with that of the other valve seat arrangement leading to the other bellows chamber. The middle chamber $b$, has only a small outlet at one end as at $f$, which communicates with a passage inclosed from the bellows chambers as at H, and opening into the outlet pipe B, leading to the burners—the chamber H, is common to both valves which discharge gas thereto alternately. The chamber $b'$, indented or otherwise formed in the valve plate of each valve arrangement, serves to receive gas from chambers $a$ and $c$ alternately as the plate vibrates—carrying it over to the chamber $b$, from whence it escapes through passage H, to outlet. The means by which the valve plates are moved is shown in Fig. 2—lever arms G—connected with upright rods C′ swinging as said rods are vibrated by the expansion and contraction of the bellows to which it is (each) connected in the chambers below as shown in Figs. 1 and 2—operate to move each valve plate alternately.

What I claim as my invention is—

1. In a gas meter the valve device E, consisting of a boxing F, subdivided internally into compartments $a$, $b$, and $c$, having bottom outlets as shown, and a valve plate F′, as cover for boxing F, pivoted at $d$, to swing laterally over the upper edge of boxing F, which serves as a valve seat—the valve plate having interiorly a chamber $b'$—and adapted for operation as set forth.

2. In a gas meter—the valve device E, consisting of the boxing or base F, internally divided into compartments $a$, $b$, $c$,—and cover F′, formed with chamber $b'$,—the cover pivoted to the boxing or base at $d$, to swing thereupon—in combination with bellows rod and lever connection, and all constructed and arranged for operation as set forth.

JOHN SHEARMAN.

Witnesses:
FRANK GORMAN,
JAMES C. HECKER.